(12) United States Patent
Applin et al.

(10) Patent No.: US 12,238,249 B2
(45) Date of Patent: Feb. 25, 2025

(54) MULTI-FUNCTION DEVICE COMMUNITIES FOR OPTIMIZATION OF DEVICE IMAGE QUALITY

(71) Applicant: Xerox Corporation, Norwalk, CT (US)

(72) Inventors: Amanda Applin, Jericho, VT (US); Kim P. Ciulla, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 285 days.

(21) Appl. No.: 18/055,391

(22) Filed: Nov. 14, 2022

(65) Prior Publication Data

US 2024/0163380 A1 May 16, 2024

(51) Int. Cl.
*G06F 3/12* (2006.01)
*H04N 1/00* (2006.01)
*H04N 1/23* (2006.01)

(52) U.S. Cl.
CPC ..... *H04N 1/00347* (2013.01); *H04N 1/00005* (2013.01); *H04N 1/00015* (2013.01); *H04N 1/00037* (2013.01); *H04N 1/00074* (2013.01); *H04N 1/00087* (2013.01); *H04N 1/00973* (2013.01); *H04N 1/2392* (2013.01); *H04N 2201/0094* (2013.01)

(58) Field of Classification Search
None
See application file for complete search history.

(56) References Cited

U.S. PATENT DOCUMENTS

| 2006/0082822 | A1 | 4/2006 | Irons et al. |
| 2007/0165258 | A1* | 7/2007 | Farrell ................ G06F 3/1252 358/1.15 |
| 2007/0279655 | A1 | 12/2007 | Murakawa |
| 2009/0303502 | A1 | 12/2009 | Robinson et al. |

FOREIGN PATENT DOCUMENTS

JP    201779455 A    4/2017

OTHER PUBLICATIONS

Applin et al., "Multi-Function Device Communities for Troubleshooting and Maintenance," U.S. Appl. No. 17/655,332, filed Mar. 17, 2022, 26 pages.
Extended European Search Report, Application No. 23205022.9-1224, dated Mar. 22, 2024; pages (10).

* cited by examiner

*Primary Examiner* — Eric A. Rust

(57) ABSTRACT

A multi-function device (MFD) is disclosed. For example, the MFD includes, a communications interface to establish a communication session with other MFDs within a community of MFDs, a processor, and a non-transitory computer readable medium storing instructions, which when executed by the processor, cause the processor to detect an undesirable image quality level of a print job, determine an optimal setting MFD in the community of MFDs, request optimal settings from the optimal setting MFD, receive the optimal settings from the optimal setting MFD, configure settings on the MFD in accordance with the optimal settings, and execute the print job with the optimal settings.

20 Claims, 7 Drawing Sheets

MULTI-FUNCTION DEVICE COMMUNITIES FOR OPTIMIZATION OF DEVICE IMAGE QUALITY

The present disclosure relates generally to multi-function devices (MFDs) and relates more particularly to MFD communities for troubleshooting and maintenance.

BACKGROUND

Multi-function devices (MFDs) are electronic devices that can perform a variety of different functions. For example, MFDs can print, scan, copy, fax, email scanned documents, transmit scanned documents to a network storage account, and the like. The MFDs can be customized to provide custom user interfaces, store custom workflows for different print jobs, and the like.

MFDs are complicated devices that run on complex software. The MFDs may have hundreds of settings that range from settings associated with how the software operates, communication settings for network communications, print job parameters, and the like.

SUMMARY

According to aspects illustrated herein, there are provided a multi-function device (MFD) and a method for optimizing device image quality via another MFD in a community of MFDs. One disclosed feature of the embodiments is an MFD that comprises a communications interface to establish a communication session with other MFDs within a community of MFDs, a processor, and a non-transitory computer readable medium storing instructions, which when executed by the processor, cause the processor to detect an undesirable image quality level of a print job, determine an optimal setting MFD in the community of MFDs, request optimal settings from the optimal setting MFD, receive the optimal settings from the optimal setting MFD, configure settings on the MFD in accordance with the optimal settings, and execute the print job with the optimal settings.

Another disclosed feature is a method for troubleshooting an MFD via another MFD in a community of MFDs. The method executed by a processor of the MFD comprises detecting an undesirable image quality level of a print job, determining an optimal setting MFD in the community of MFDs, requesting optimal settings from the optimal setting MFD, receiving the optimal settings from the optimal setting MFD, configuring settings on the MFD in accordance with the optimal settings, and executing the print job with the optimal settings.

Another disclosed feature is an MFD comprising a communications interface to establish a communication session with other MFDs within a community of MFDs, a processor, and a non-transitory computer readable medium storing instructions, which when executed by the processor, cause the processor to receive a request from a requesting MFD for optimal settings from an optimal setting MFD within the community of MFDs, identify the optimal setting MFD within the community of MFDs, request optimal settings from the optimal setting MFD, and transmit the optimal settings to the requesting MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses MFD communities for optimization of device image quality and methods for performing the same. As discussed above, MFDs are complicated devices that run on complex software. The MFDs may have hundreds of settings that can affect image quality. Changing one parameter can affect the image quality.

Certain office buildings or enterprise locations may have many MFDs located throughout the building or campus. As users move about the building or campus, the user may use different MFDs. However, each MFD may have different default settings and/or different MFDs with the same settings may produce images with different levels of image quality. This can lead to a frustrating user experience.

Operators today do not always get training on how to keep the MFDs working optimally. Also keeping trained operators is difficult and costly for many employers. Providing a system that is easy to maintain would benefit all customers, as well as the manufacturers of the MFD.

Image/Print Quality can be very subjective. One customer's "Red," might be perfect, while another customer's "Red" is too pale. So, even a trained support person has difficulty maintaining equipment at its peak performance without direct help from the customer/operator.

The present disclosure leverages MFD communities that can allow MFDs within the community to optimize device image quality by sharing settings or parameters for a particular print job. For example, when the image quality of a print on an MFD is below a desired quality level, the MFD may communicate with other MFDs within the MFD community to obtain optimal settings. The MFD may implement the optimal settings and regenerate the print to the desired quality level.

As a result, MFDs may automatically optimize image quality by leveraging MFD communities. Users who are unfamiliar with how to modify settings can still obtain desired image quality on print jobs generated by the MFD. This may lead to a more satisfying user experience on the MFDs.

Figure 1:
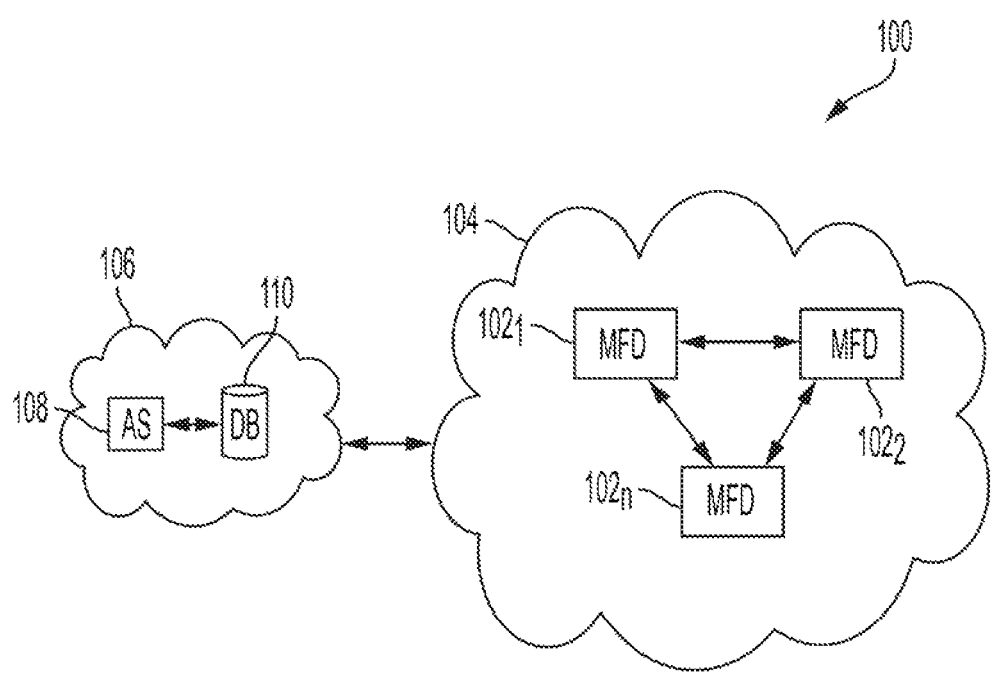
FIG. 1 illustrates an example network that includes a community of MFDs of the present disclosure for troubleshooting and maintenance.

FIG. 1 illustrates an example network 100 of the present disclosure. The network 100 may include a community 104 of multi-function devices (MFDs) $102_1$ to $102_n$ (hereinafter also referred to individually as an MFD 102 or collectively as MFDs 102).

The network 100 may also include an internet protocol (IP) network 106. The IP network 106 may include an application server (AS) 108 and a database (DB) 110. The IP network 106 may be managed and operated by a manufacturer or service provider of the MFDs 102. For example, the AS 108 may be an apparatus or print server that manages the print jobs and overall operation of the MFDs 102 for an enterprise or company.

In one embodiment, the DB 110 may store various information related to the MFDs 102. The DB 110 may also store a ranked list of the MFDs 102 that rank the MFDs 102 based on an image quality score or assessment. The ranked list is discussed in further details below. Although the AS 108 and the DB 110 are illustrated in FIG. 1 as separate components, it should be noted that the AS 108 and DB 110 may be part of a single apparatus (e.g., the DB 110 may be deployed as memory in the AS 108).

In one embodiment, the community 104 may include the MFDs 102. Within an enterprise location or building there may be several communities 104 of MFDs 102. The communities 104 may have an equal number of MFDs 102 or may have different numbers of MFDs 102.

In one embodiment, a community 104 of MFDs 102 may be defined as a group of MFDs 102 that are within a common network. For example, the common network may be a network that connects various different geographic locations or campuses of an enterprise, a WiFi network within the enterprise location, a particular subnet within the WiFi network, and the like.

In one embodiment, the community 104 of MFDs 102 may be defined as a group of MFDs 102 that are within a user defined boundary and that are within range of one another via a local communications interface. For example, the community 104 may include MFDs 102 that are within near field communications (NFC) radio reception of one another or Bluetooth radio reception of one another.

In one embodiment, the community 104 of MFDs 102 may be defined by those MFDs that are directly connected to one another. For example, the MFDs $102_1$ to $102_n$ may be directly connected to one another via a wired Ethernet connection.

In one embodiment, each MFD 102 may be assessed an image quality score. The image quality score may be assessed by users after each print job. For example, after each print job the MFD 102 may ask the user to provide an image quality score.

In another embodiment, the image quality score may be assessed by technicians based on test images. For example, the image quality score may be based on a review of test images that are printed out by each MFD 102 before the MFDs 102 are deployed. The image quality score may be a numerical value of the overall image quality (e.g., a value between 1-5 or 1-10 or any other desired numerical range). The image quality score may be operator assigned scoring to account for user preferences.

In one embodiment, the image quality score may be based on an average of scores for each adjustable setting. For example, each MFD 102 may have various settings that can be adjusted to improve the image quality for a print out or print job. Examples of adjustable settings may include a color value (e.g., a color map showing L*ab values of colors, data related to how much of each color print head of a CYMK system was dispensed for each color, and so forth), a sharpness value, a contrast value, a resolution value, a brightness value, a zoom value, a paper type, and the like.

An image printed by the MFD 102 may have a score assessed for each adjustable setting. The average of the scores may be used to calculate the overall image quality score of each MFD 102.

In one embodiment, the image quality score may be calculated for different types of print jobs. For example, the image quality score may be assessed for black and white images, colored images, photographs, text documents, and the like. Thus, each MFD 102 may have a different image quality score for different types of print jobs that can be executed by the MFDs 102.

The MFDs 102 may then be ranked based on the image quality scores that are assessed. The ranked list may be stored locally on each MFD 102 or may be stored in the DB 110 of the AS or print server 108. The ranked lists may be used by the MFDs 102 to obtain optimal settings for print jobs when an image quality on a particular MFD 102 falls below a desired image quality level or the particular MFD 102 detects an undesirable image quality level of a print job.

In one embodiment, the ranked list may also include environmental information where the MFDs 102 are located. For example, environmental parameters may also affect the image quality. For example, temperature and humidity levels may affect the image quality. Thus, when looking for optimal settings, an MFD 102 may search for MFDs 102 on the ranked list that have similar environmental parameters.

In one embodiment, the ranked list may be dynamically or periodically updated. For example, after the MFDs 102 are deployed, the image quality scores can be updated. In one embodiment, the MFDs 102 may prompt a user to enter an image quality score after each print job is executed. The image quality score can be a numerical score (e.g., between 1-5, 1-10, and the like) or a numerical score for each adjustable setting, as described above. In one embodiment, the MFDs 102 may prompt a user after a predetermined number of print jobs are executed. For example, the user may be prompted after every 25 print jobs.

The additional image quality scores may be averaged into the existing scores on the ranked list. The ranking of the MFDs 102 may be updated based on the updated image quality scores.

In one embodiment, the MFD 102 with the highest image quality score may be determined to be the "optimal setting" MFD. In other words, when other MFDs 102 detect an undesirable image quality for a print job, the other MFDs 102 may request the optimal settings from the optimal setting MFD. The optimal settings may be transmitted to a requesting MFD 102 and the requesting MFD 102 may then automatically configure the settings for a print job to the optimal settings and re-execute the print job.

In one embodiment, an "optimal setting" MFD may be identified for different types of print jobs. For example, some MFDs 102 may have better image quality for color print jobs, some MFDs 102 may have better image quality for text, some MFDs 102 may have better image quality for photographs, and so forth. In one embodiment, an "optimal setting" MFD may be based on additional parameters in addition to the image quality scores. For example, the ranked list may have a model number of each of the MFDs 102 and/or environmental parameters. Thus, a particular MFD 102 may search for an "optimal setting" MFD that has the highest score with the same model number in a similar environment. Thus, the "optimal setting" MFD may be chosen from the ranked list based on a job type, a model number, and/or environmental parameters.

Thus, the community 104 of MFDs 102 may be leveraged by each MFD 102 to optimize device image quality using the ranked list of MFDs 102 based on image quality scores. As a result, a user is not required to know how to adjust the various settings to optimize an image quality if the user is unhappy with the image quality of a print job. Rather, when an undesirable image quality is detected (as discussed in further details below), the MFD 102 may automatically find the optimal settings from an optimal setting MFD 102. The optimal settings can be configured automatically as the settings for the print job and the print job can be re-executed to optimize the image quality and provide a better user experience with the MFDs 102.

It should be noted that the network 100 has been simplified for ease of explanation and may include other devices and components that are not shown. For example, the network 100 may include gateways, switches, routers, firewalls, access points, access networks, and the like.

Figure 2:
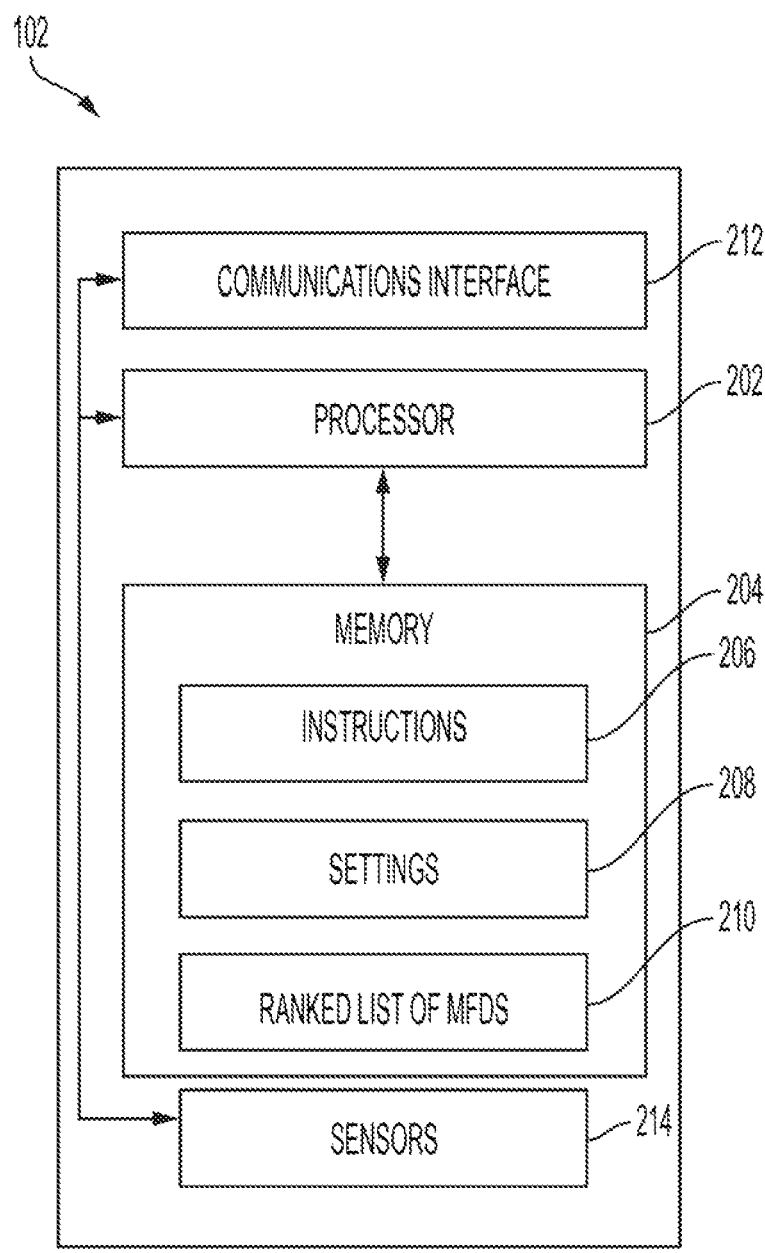
FIG. 2 illustrates a block diagram of an example MFD of the present disclosure.

FIG. 2 illustrates a block diagram of an example MFD 102 illustrated in FIG. 1. In one embodiment, the MFD 102 may include a processor 202, a memory 204, a communications interface 212, and one or more sensors 214. The processor 202 may be communicatively coupled to the memory 204, and the communications interface 212. The processor 202 may control operation of the communications interface 212 and may receive and/or transmit information (e.g., optimal settings, and the like) via the communications interface 212.

In one embodiment, the communications interface 212 may be used to establish a communication path between the other MFDs 102 within the community 104 and/or the AS 108 via the IP network 106. For example, the communications interface 212 may be a wireless or wired communications interface. For example, the communications interface 212 may be a WiFi radio, an Ethernet connection, a fax over IP connection that uses an RJ-111 connection, a cellular radio, and the like.

In one embodiment, the communications interface 212 may also include a local communications interface that allows the MFDs 102 to communicate with other MFDs 102 within the community 104. For example, the MFD $102_2$ may communicate with the MFDs $102_1$ and $102_n$ via local communications interfaces such as NFC, Bluetooth Radio, or a directly wired Ethernet connection to MFDs $102_1$ and $102_n$.

In one embodiment, the memory 204 may be any type of non-transitory computer readable medium. For example, the memory 204 may be a hard disk drive, a solid state drive, a random access memory, a read only memory, and the like. The memory 204 may store instructions 206 that are executed by the processor 202 to perform the functions described herein. For example, the instructions may cause the processor 202 to perform operations described in FIG. 4 or the method 600 illustrated in FIG. 6, and discussed in further detail below.

In one embodiment, the memory 204 may also store settings 208 and a ranked list of MFDs 210. In one embodiment, the settings 208 may be parameters that can be adjusted by a user to adjust an image quality of print jobs. For example, the user adjustable settings may include a color value, a sharpness value, a contrast value, a resolution value, a brightness value, a zoom value, a paper type, or any other adjustable parameters.

In one embodiment, the color value may include a color map showing L*ab values of colors, data related to how much of each color print head of a CYMK system was dispensed for each color, and so forth. For example, the same color value printed by two different MFDs 102 may appear slightly different. The MFD 102 may adjust the color value or an amount of each color that is dispensed by a respective color printhead to generate the desired color. In one embodiment, a table of color adjustments may be stored in the memory 204 for each MFD 102 to generate the desired appearance of each color on a printed image for a particular color value.

In one embodiment, the paper type may also affect the image quality of a print job. For example, printed images may appear differently on different brightness level of paper. Printed images may appear differently on whether the paper has a glossy finish or a matte finish. The weight of the paper may also affect the perceived image quality of a print job.

The resolution value may affect how sharp or blurry the image quality appears in the print job. For example, lower resolution values may print faster, but appear more blurry than higher resolution values. The zoom value may also affect how blurry an image appears. For example, zooming in on an image to enlarge the image on a print job may cause the image to become more pixelated or blurry when printed. The sharpness value, the contrast value, and the brightness value may also affect the image quality score of the printed image.

In one embodiment, the ranked list of MFDs 210 may include a list of the MFDs 102 that are ordered based on an image quality score. The image quality score may be calculated, as discussed above. The order of the MFDs 102 in the ranked list of MFDs 210 may periodically change as the image quality scores are updated, as discussed above. The ranked list of MFDs 210 may include additional information for each MFD 102, such as a model number, different image quality scores for different job types, environmental parameters, and the like.

In one embodiment, the MFD 102 may also include one or more sensors 214. The sensors 214 may be environmental sensors that can measure values associated with the environment. For example, the sensors 214 may be a thermometer, a humidity sensor, and the like.

It should be noted that the MFD 102 has been simplified for ease of explanation in FIG. 2 and may include other components that are not shown. For example, the MFD 102 may also include a paper tray, an optical scanner, one or more printheads (e.g., for printing fluid or toner), a digital front end, one or more finishing modules, and the like.

Figure 5:
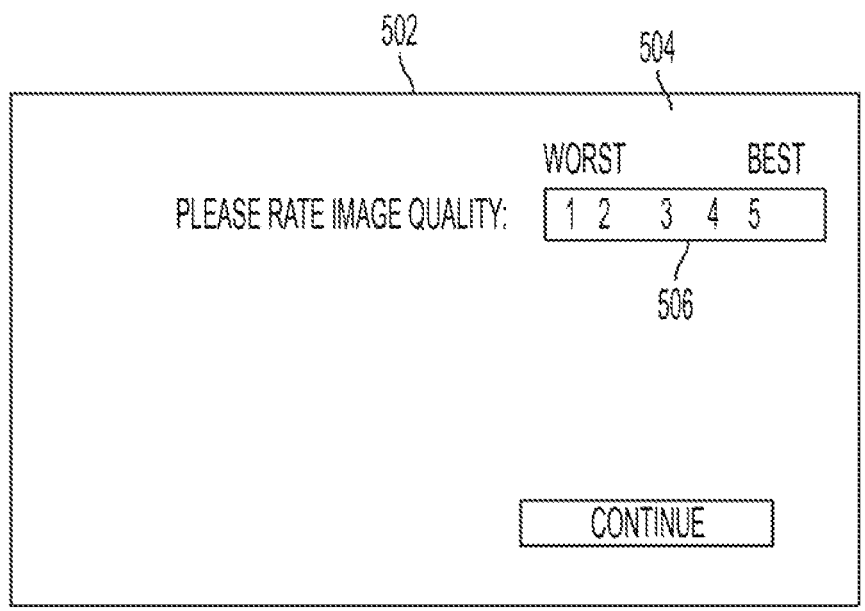
FIG. 5 illustrates an example graphical user interface for scoring image quality of a print job of the present disclosure.

In one embodiment, the MFD 102 may also include a graphical user interface (GUI). FIG. 5 illustrates an example GUI 504 shown by a display 502 of the MFD 102. For example, the GUI 504 may be presented after a print job is executed. The GUI 504 may ask the user to score the image quality of the print job. A scoring scale 506 may be presented. The user may select a value using a touch screen interface or pointing device to provide the image quality score.

It should be noted that the GUI 504 provides an example of the scoring scale 506. The scoring scale 506 may be any range of values or may be simply deployed as a range of graphical icons (e.g., frowning faces to happy faces). Although FIG. 5 illustrates an example, where an overall score is entered, the GUI 504 may present a scoring scale 506 for each adjustable setting to provide a more detailed scoring of the image quality, as discussed above.

Figure 3:
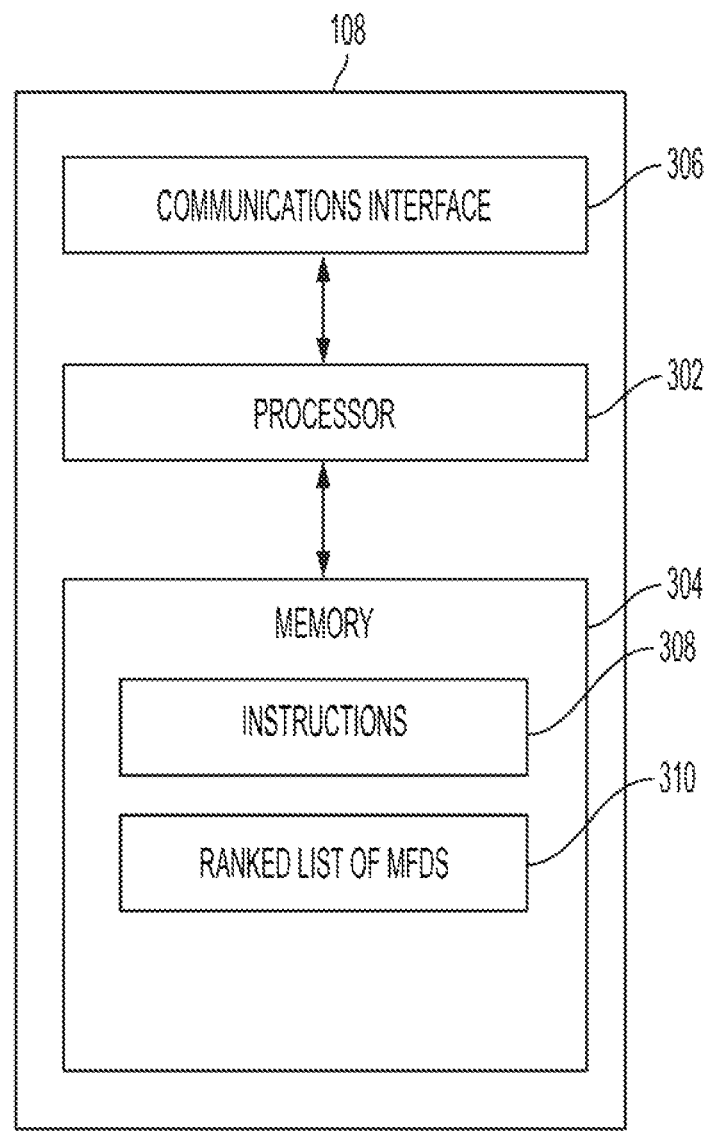
FIG. 3 illustrates an example of a print server of the present disclosure.

Referring to FIG. 3, FIG. 3 illustrates a block diagram of an example AS 108 illustrated in FIG. 1. As noted above, the AS 108 may be a print server that manages the print jobs executed by the MFDs 102.

In one embodiment, the AS 108 may include a processor 302, a memory 304, and a communications interface 306.

The processor 302 may be communicatively coupled to the memory 304, and the communications interface 306. The processor 302 may control operation of the communications interface 306 and may receive and/or transmit information (e.g., optimal settings, image quality scores from the MFDs 102, and the like) via the communications interface 312.

In one embodiment, the memory 304 may be any type of non-transitory computer readable medium. For example, the memory 304 may be a hard disk drive, a solid state drive, a random access memory, a read only memory, and the like. The memory 304 may store instructions 308 that are executed by the processor 302 to perform the functions described herein. For example, the instructions may cause the processor 302 to perform operations to optimize image quality of a print job of an MFD 102.

For example, the instructions may cause the processor to receive a request from a requesting MFD for optimal settings from an optimal setting MFD within the community of MFDs, identify the optimal setting MFD within the community of MFDs, request optimal settings from the optimal setting MFD, and transmit the optimal settings to the requesting MFD.

In one embodiment, the memory 304 may also store a ranked list of MFDs 310. As described above with respect to the ranked list of MFDs 210, the ranked list of MFDs 310 may include a list of the MFDs 102 that are ordered based on an image quality score. The image quality score may be calculated, as discussed above. The order of the MFDs 102 in the ranked list of MFDs 310 may periodically change as the image quality scores are updated, as discussed above. The ranked list of MFDs 310 may include additional information for each MFD 102, such as a model number, different image quality scores for different job types, environmental parameters, and the like.

Figure 4:
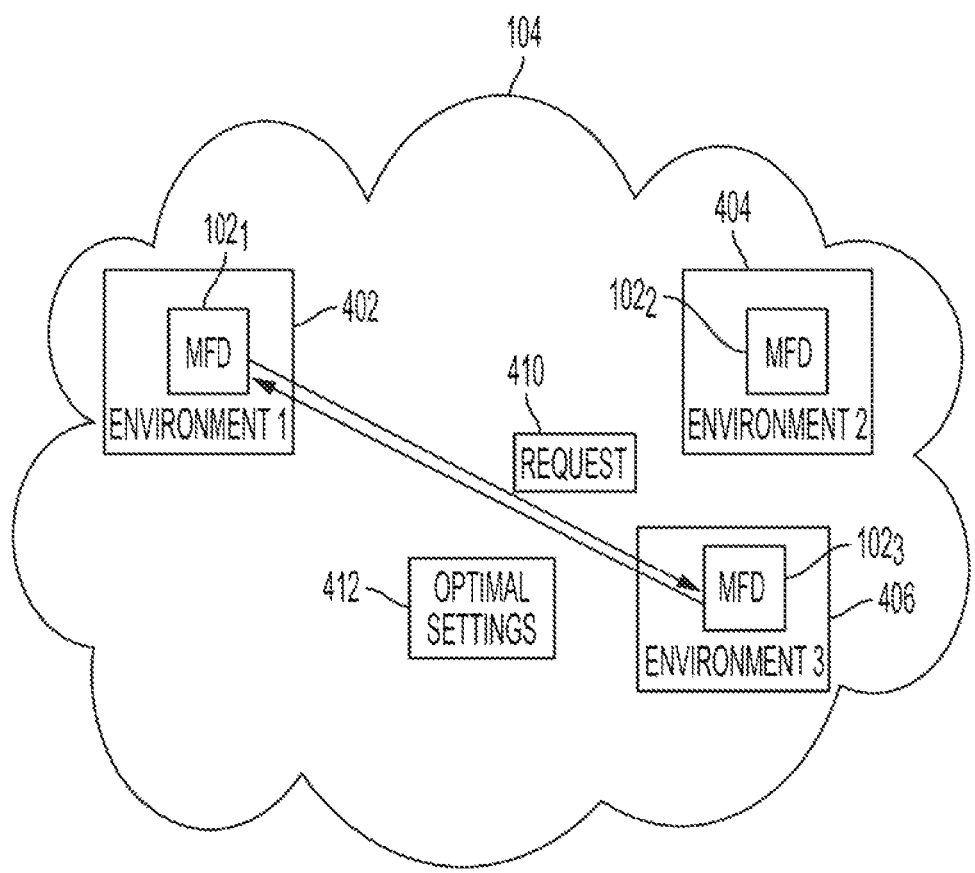
FIG. 4 illustrates an example of an MFD obtaining optimal print settings from an optimal setting MFD of the present disclosure.

FIG. 4 illustrates an example of an MFD obtaining optimal settings from an optimal setting MFD of the present disclosure. FIG. 4 illustrates an example that includes a community 104 of three MFDs $102_1$, $102_2$, and $102_3$. Although only three MFDs are used in the example illustrated in FIG. 4, it should be noted that any number of MFDs 102 may be deployed in the community 104. For example, there may be tens or hundreds of MFDs 102 distributed across an enterprise that are within the community 104.

Referring back to the example illustrated in FIG. 4, the MFD $102_1$ may be in a location 402 in a first environment (environment 1), the MFD $102_2$ may be in a location 404 in a first environment (environment 2), and the MFD $102_3$ may be in a location 406 in a first environment (environment 3). The locations 402, 404, and 406 may be different geographic locations connected by a network of an enterprise, may be in different buildings within a campus or a common location, or in different rooms within a single building of an enterprise.

In an example, a user may select the MFD $102_1$ to execute a print job. The user may execute the print job and the MFD $102_1$ may detect an undesirable image quality level for the print job. In one embodiment, the undesirable image quality level may be detected based on a user image quality score. For example, using the GUI 504 the user may be asked to score the image quality of the print job on a scale of 1-5. The image quality score threshold may be 4. For example, a score of 4 or higher may be acceptable and a score of 3 or less may be associated with an undesirable image quality level. The user may provide a score of 3 causing the MFD $102_1$ to detect an undesirable image quality level.

In another embodiment, the MFD $102_1$ may use machine learning to detect an undesirable image quality level. For example, the MFD $102_1$ may learn that print jobs with image quality scores of 3 or less are associated with a predetermined number of adjustments and re-execution of a print job. In other words, a user is changing settings and reprinting the print job to try and get a desired image quality. For example, when users are dissatisfied with the image quality of a print job, the user may adjust at least one setting and re-execute the print job at least three times. Thus, when the MFD $102_1$ detects that a print job (e.g., selecting the same file for the print job) is executed three times with at least one setting being changed each time the print job is re-executed, the MFD $102_1$ may detect an undesirable image quality.

In response to detecting the undesirable image quality, the MFD $102_1$ may check the ranked list of MFDs 210 to determine the highest ranked MFD in the ranked list 210. The highest ranked MFD may be identified as the optimal setting MFD. In an example, the highest ranked MFD may be the MFD $102_3$. The MFD $102_1$ may send a request 410 for optimal settings for the print job from the MFD $102_3$.

The MFD $102_3$ may transmit the optimal settings 412 to the MFD $102_1$ in response to the request 410. The MFD $102_1$ may receive the optimal settings 412 and automatically configure the settings 208 with the values associated with the optimal settings.

In one embodiment, the MFD $102_1$ may notify the user via the GUI 504 that an undesirable image quality level is detected and that the MFD $102_1$ is obtaining optimal settings for the print job. After the settings 208 are updated with the optimal settings 412, the MFD $102_1$ may prompt the user to re-execute the print job.

In one embodiment, the user may be prompted to re-score the image quality after executing the print job with the optimal settings 412. If the user score is still below the image quality score threshold, the MFD $102_1$ may require servicing (e.g., the toner is low, an ink cartridge is low, there may be dirt in the paper path causing defects, and the like). The MFD $102_1$ may generate and display a notification via the display 502 that the MFD $102_1$ may require servicing in response to the image quality score still being below the image quality score threshold.

In another embodiment, the selection of the optimal setting MFD from the ranked list 210 may be more complicated. For example, the MFD $102_2$ may have the highest overall image quality score. However, the MFD $102_2$ may have different capabilities or be a different model number than the MFD $102_1$. For example, the MFD $102_2$ may be a model of a color printer that uses three different colored ink cartridges rather than the model of the MFD $102_1$ that uses four different colored ink cartridges. In addition, the environment 2 may be at a hotter temperature and a higher humidity than the environment 1.

The MFD $102_3$ may have a lower overall image quality score than the MFD $102_2$. However, the MFD $102_3$ may be the same model number as the MFD $102_1$. For example, the MFD $102_3$ may use four different colored ink cartridges similar to the MFD $102_1$. In addition, the environment 3 of the MFD $102_3$ may have a similar temperature and humidity level as the environment 1. Thus, the MFD $102_1$ may select the MFD $102_3$ as the optimal setting MFD and request the optimal settings from the MFD $102_3$ even though the MFD $102_3$ has a lower image quality score than the MFD $102_2$.

In another embodiment, the optimal setting MFD may be selected based on the type of print job. For example, the MFD $102_2$ may have the highest image quality score for photograph print jobs and the MFD $102_3$ may have the highest image quality score for black and white text documents. The MFD $102_1$ may be executing a print job that includes a black and white text document. Thus, the MFD $102_1$ may select the MFD $102_3$ as the optimal setting MFD.

In one embodiment, all parameters may be considered when selecting the optimal setting MFD. For example, the MFD $102_1$ may select the optimal setting MFD based on the MFD with the highest image quality score for a print job type having the same model number and environmental parameters.

Although the example in FIG. 4 illustrates the MFDs $102_1$-$102_3$ communicating directly with one another, in one embodiment, the AS 108 or print server 108 may be used as an intermediary between the MFDs $102_1$-$102_3$. For example, the MFD $102_1$ may send the request to the AS 108 when the undesirable image quality level is detected. The AS 108 may then select the optimal setting MFD from the ranked list 310. The AS 108 may send the request 410 to the optimal setting MFD and receive the optimal settings 412 from the optimal setting MFD. The AS 108 may then transmit the optimal settings 412 to the MFD $102_1$.

Figure 6:
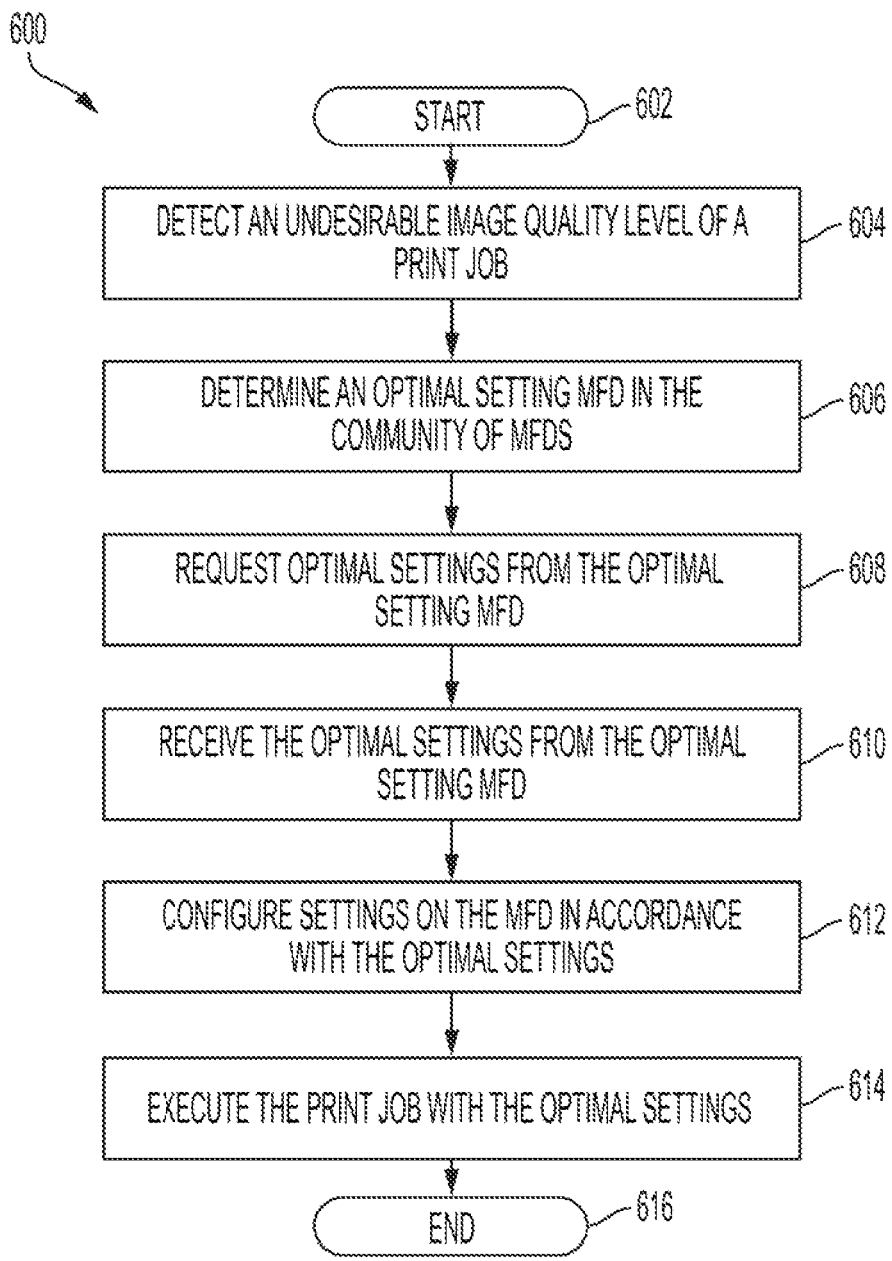
FIG. 6 illustrates a flow chart for a method of optimizing device image quality via another MFD in a community of MFDs of the present disclosure.

FIG. 6 illustrates a flow chart of an example method 600 for optimizing device image quality via another MFD in a community of MFDs of the present disclosure. In one embodiment, the method 600 may be performed by any of the MFDs 102 described above or by an apparatus such as the apparatus 700 illustrated in FIG. 7 and discussed below.

In one embodiment, the method 600 begins at block 602. At block 604, the method 600 detects an undesirable image quality level of a print job. For example, the undesirable image quality level can be detected based on an image quality score that is below a threshold. For example, the image quality score threshold may be 7 or less based on a 10 point scale. For example, a user may score the image quality of a print job at a score of 6. Thus, the undesirable image quality level can be detected.

In another example, the undesirable image quality level can be detected based on a number of executions of the print job with changes to a setting that is greater than a threshold. For example, the threshold may be two. When a user re-executes the same print job (e.g., the same file is selected for the print job) two or more time while changing at least one different setting in each execution of the print job, the undesirable image quality level may be detected.

At block 606, the method 600 determines an optimal setting MFD in the community of MFDs. For example, a ranked list of MFDs may be used to select the MFD with the highest image quality score as the optimal setting MFD.

In one embodiment, other factors may be considered other than just the highest image quality score. For example, the factors may include a particular job type, a model number of the MFD, and environmental parameters. Thus, in one embodiment, the MFD with the highest image quality score for a particular print job type and at least one additional matching factor may be selected as the optimal setting MFD. In one embodiment, the MFD with the highest image quality score for a particular print job type, matching model number, and the same, or within an acceptable range of values of environmental parameters may be selected as the optimal setting MFD.

At block 608, the method 600 requests optimal settings from the optimal setting MFD. For example, the MFD that detected the undesirable image quality level may send a request for optimal settings to the optimal setting MFD that was identified. The request may be for optimal settings of one or more user adjustable settings that can affect image quality of a print job. As noted above, the user adjustable settings may include a color value, a sharpness value, a contrast value, a resolution value, a brightness value, a zoom value, a paper type, or any other adjustable parameters.

At block 610, the method 600 receives the optimal settings from the optimal setting MFD. The optimal settings may include values for at least one setting that can be adjusted. In one embodiment, the optimal settings may include values for each user adjustable setting for a particular job type.

At block 612, the method 600 configures settings on the MFD in accordance with the optimal settings. For example, the MFD may automatically change the value of each setting locally on the MFD using the values of the associated optimal settings. For example, the brightness value may be set to 40% and the contrast value may be set to 70% locally on the MFD. However, the optimal settings for the print job may have the brightness value set to 50% and the contrast value set to 60%. Thus, the MFD may automatically change the local brightness value to 50% and the local contrast value to 60% in accordance with the optimal settings.

At block 614, the method 600 executes the print job with the optimal settings. In one embodiment, the user may be prompted to provide an image quality score after the print job is re-executed with the optimal settings. If the image quality score is still below the image quality score threshold, it may be determined that the MFD requires service. The MFD may generate and display a notification in response to the low image quality score that the MFD require servicing. For example, the toner may be low, an ink cartridge may have run out of ink, there may be dirt in the paper path, and the like, that may be causing image quality issues. At block 616, the method 600 ends.

Figure 7:
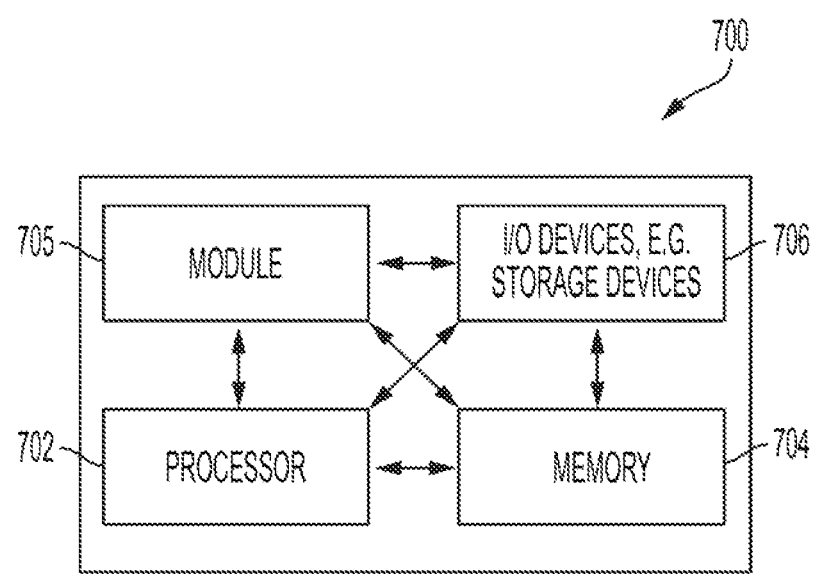
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for optimizing device image quality via another MFD in a community of MFDs, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for optimizing device image quality via another MFD in a community of MFDs (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for optimizing device image quality via another MFD in a community of MFDs (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD) comprising:
a communications interface to establish a communication session with other MFDs within a community of MFDs;
a processor; and
a non-transitory computer readable medium storing instructions, which when executed by the processor, cause the processor to:
detect an undesirable image quality level of a print job;
determine an optimal setting MFD in the community of MFDs;
request optimal settings from the optimal setting MFD;
receive the optimal settings from the optimal setting MFD;
configure settings on the MFD in accordance with the optimal settings; and
execute the print job with the optimal settings.

2. The MFD of claim 1, wherein the undesirable image quality level is detected based on an image quality score that is below a threshold.

3. The MFD of claim 1, wherein the undesirable image quality level is detected based on a number of executions of the print job with changes to a setting that is greater than a threshold.

4. The MFD of claim 1, wherein the optimal setting MFD in the community of MFDs is determined based on a ranked list of MFDs in the community of MFDs.

5. The MFD of claim 4, wherein the ranked list of MFDs comprises a score for each MFD in the community of MFDs based on a feedback score of an image quality of each print job.

6. The MFD of claim 5, wherein the optimal setting MFD in the community of MFDs is an MFD with a highest score for a type of print job.

7. The MFD of claim 5, wherein the optimal setting MFD in the community of MFDs is an MFD with a highest score with a same model number.

8. The MFD of claim 5, wherein the optimal setting MFD in the community of MFDs is an MFD with a highest score in an environment that is similar to an environment of the MFD that is requesting the optimal settings.

9. The MFD of claim 1, wherein the community of MFDs comprises MFDs that are on a common network.

10. The MFD of claim 1, wherein the processor is further to:
receive an image quality score of the print job executed with the optimal settings that is below an image quality score threshold; and
generate a notification that the MFD requires servicing in response to the image quality score being below the image quality score threshold.

11. The MFD of claim 1, wherein the settings comprise at least one of: a color value, a sharpness value, a contrast value, a resolution value, a brightness value, a zoom value, or a paper type.

12. A method comprising:
detecting, by a processor of a multi-function device (MFD), an undesirable image quality level of a print job;
determining, by the processor, an optimal setting MFD in a community of MFDs;
requesting, by the processor, optimal settings from the optimal setting MFD;
receiving, by the processor, the optimal settings from the optimal setting MFD;
configuring, by the processor, settings on the MFD in accordance with the optimal settings; and
executing, by the processor, the print job with the optimal settings.

13. The method of claim 12, wherein the undesirable image quality level is detected based on an image quality score that is below a threshold.

14. The method of claim 12, wherein the undesirable image quality level is detected based on a number of executions of the print job with changes to a setting that is greater than a threshold.

15. The method of claim 12, wherein the optimal setting MFD in the community of MFDs is determined based on a ranked list of MFDs in the community of MFDs.

16. The method of claim 12, further comprising:
receiving, by the processor, an image quality score of the print job executed with the optimal settings that is below an image quality score threshold; and
generating, by the processor, a notification that the MFD requires servicing in response to the image quality score being below the image quality score threshold.

17. An apparatus comprising:
a communications interface to establish a communication session with MFDs within a community of MFDs;
a processor; and
a non-transitory computer readable medium storing instructions, which when executed by the processor, cause the processor to:
receive a request from a requesting MFD for optimal settings from an optimal setting MFD within the community of MFDs;
identify the optimal setting MFD within the community of MFDs;
request optimal settings from the optimal setting MFD; and
transmit the optimal settings to the requesting MFD.

18. The apparatus of claim 17, wherein the request includes a job type, at least one environmental parameter, and a model number of the MFD.

19. The apparatus of claim 18, wherein the at least one environmental parameter comprises at least one of: a humidity level or a temperature.

20. The apparatus of claim 17, wherein the optimal settings comprise at least one of: a color value, a sharpness value, a contrast value, a resolution value, a brightness value, a zoom value, or a paper type.

\* \* \* \* \*